(12) United States Patent
Sutton

(10) Patent No.: US 7,591,674 B2
(45) Date of Patent: *Sep. 22, 2009

(54) RELAY RETROFIT APPARATUS HAVING A RELAY WITH TWO DIFFERENT SETS OF CONTACTS, AND METHOD FOR RETROFITTING A PORTION OF AN ELECTRICAL SYSTEM

(75) Inventor: Stephen Douglas Sutton, Kennesaw, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/948,013

(22) Filed: Nov. 30, 2007

(65) Prior Publication Data

US 2008/0070432 A1 Mar. 20, 2008

Related U.S. Application Data

(63) Continuation of application No. 11/096,977, filed on Mar. 31, 2005, now Pat. No. 7,322,849.

(51) Int. Cl.
 *H01R 11/00* (2006.01)
(52) U.S. Cl. ...................................... 439/502
(58) Field of Classification Search ................. 439/502, 439/211, 214, 215, 505, 680
 See application file for complete search history.

(56) References Cited

U.S. PATENT DOCUMENTS 2,825,782 A * 3/1958 Rhodes ....................... 335/202
4,781,393 A * 11/1988 Jeter ........................... 307/10.1
4,815,983 A    3/1989 Erickson et al.
5,281,147 A * 1/1994 Hughes ....................... 439/35
5,340,331 A    8/1994 Bohlen et al.
5,378,168 A    1/1995 Sumida
6,036,533 A    3/2000 Huang et al.
6,846,198 B1   1/2005 Rasmussen
2004/0248462 A1 12/2004 Dyer et al.

FOREIGN PATENT DOCUMENTS

| CH | 681 338 | 2/1993 |
| DE | 199 21 967 A1 | 11/2000 |
| EP | 0 317 475 A | 5/1989 |
| EP | 0 413 935 A | 2/1991 |
| GB | 2 301 234 A | 11/1996 |
| JP | 05 168124 A | 7/1993 |

OTHER PUBLICATIONS

International Search Report from corresponding International Application No. PCT/US06/011654 dated Mar. 29, 2006.
Written Opinion of the International Searching Authority from corresponding International Application No. PCT/US2006/011654.
Yazaki Corp & Shimoji Eiji, "Fixing Structure for Electric Joint Box and Relay Unit." Patent Abstracts of Japan, Oct. 20, 1993, JP 05 168124 A, vol. 017, No. 578 (E-1450), Jul. 2, 1993.

* cited by examiner

*Primary Examiner*—Chandrika Prasad
(74) *Attorney, Agent, or Firm*—Alston & Bird LLP

(57) ABSTRACT

The invented apparatus is designed for use within a vehicle's electrical system. The apparatus electrically couples a plug having a first electrical contact configuration with a relay having a different electrical contact configuration. The apparatus provides an easy and inexpensive solution for replacing relay's that have different electrical contact configurations.

23 Claims, 4 Drawing Sheets

RELAY RETROFIT APPARATUS HAVING A RELAY WITH TWO DIFFERENT SETS OF CONTACTS, AND METHOD FOR RETROFITTING A PORTION OF AN ELECTRICAL SYSTEM

CROSS-REFERENCE TO RELATED APPLICATIONS

This application is a continuation of U.S. application Ser. No. 11/096,977, filed Mar. 31, 2005, now U.S. Pat. No. 7,322,849, which is hereby incorporated herein in its entirety by reference.

BACKGROUND OF THE INVENTION

Currently, replacing a relay located within a vehicle's electrical system requires a labor intensive effort on the part of a mechanic. Never is the case truer than when the new relay has a different electrical contact configuration than the original. The vehicle's socket, which is configured to receive a relay having a specific electrical configuration, is not capable of connecting with a relay having a different contact configuration. Therefore, the mechanic is forced to either replace the socket with one that fits the new relay, or cut the vehicle's socket out and splice the new relay directly into the vehicle's electrical system. Either procedure is both time consuming and labor intensive. In addition, each procedure introduces the possibility of human error not subject to routine quality control measures. If the work is performed improperly, particularly if the relay is related to a critical safety system of the vehicle, a dangerous condition may result which could lead to damage to the vehicle and its human occupants. Accordingly, there is a need for a device that can easily replace relays having different electrical contact configurations, and do so with assurance of proper connection of the new relay to the vehicle's electrical system.

BRIEF SUMMARY OF THE INVENTION

The present invention overcomes the deficiencies of the prior art by providing an apparatus for replacing one relay with a new relay when the two have different electrical contact configurations.

Generally described, the invention is directed toward an apparatus comprising a plug having electrical contacts and a relay electrically coupled to the plug, in which the plug and the relay have electrical contacts configured differently from one another.

In other embodiments, the apparatus can use wiring to connect the relay with the plug. In addition, in some embodiments, the wiring can be insulated. The apparatus can further comprise a shroud that is attached adjacent the plug wherein the shroud encases at least a portion of the electrical contacts of the plug to provide a weatherproof connection when the plug is inserted into a socket. In one embodiment, the relay has a 75 amp dual pole configuration.

In an alternative embodiment, the invention is directed to an apparatus comprising a plug having electrical contacts configured to be inserted into a first socket configured for a first relay, wiring having first ends connected to the electrical contacts of the plug and second ends opposite the first ends, and a connector having electrical contacts connected to the second ends of the wiring, wherein the connector is configured to receive contacts of a second relay having electrical contacts with a different configuration than the electrical contacts of the first relay.

In some embodiments, the wiring is insulated while other embodiments include a detachable connector. In one embodiment, the connector is a socket. In yet another embodiment, the apparatus further comprises a shroud attached adjacent the plug. In a different embodiment, the shroud encases at least a portion of the electrical contacts of the plug when the plug is inserted into a first socket. In yet another embodiment, the first and second relays have different amperage ratings. In still another embodiment, the first socket is configured to receive a first relay having a 40 amp single pole configuration and the second relay has a 75 amp dual pole configuration.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

I. Structure of the Relay Retrofit Apparatus

A relay retrofit apparatus 10 is formed by electrically coupling a relay 50 having a first electrical contact configuration 60 to a plug 30 having a second electrical contact configuration. The first contact configuration of the relay 50 is different than the second electrical contact configuration of the plug 30. Provided below is a written description of the elements that comprise the embodiment of the relay retrofit apparatus 10 as shown in FIG. 1.

The Plug

Figure 1:
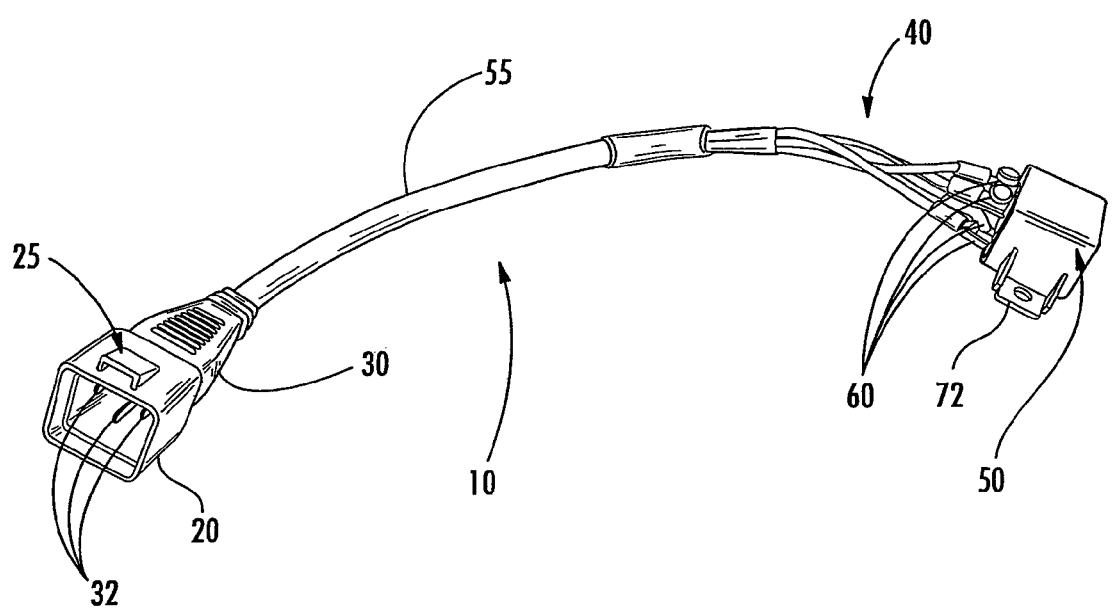
FIG. 1 shows one embodiment of the relay retrofit apparatus.
Figure 2:
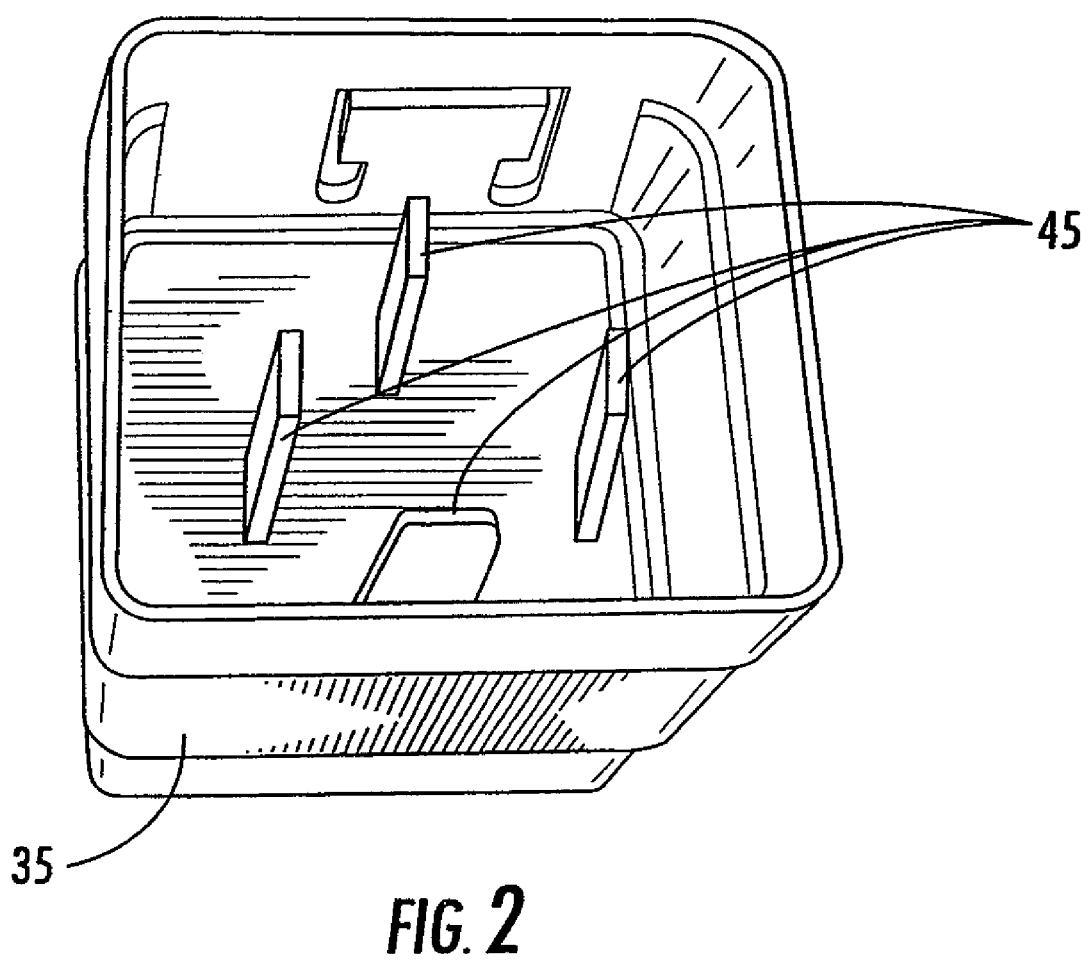
FIG. 2 shows a 40 amp single pole relay.
Figure 5:
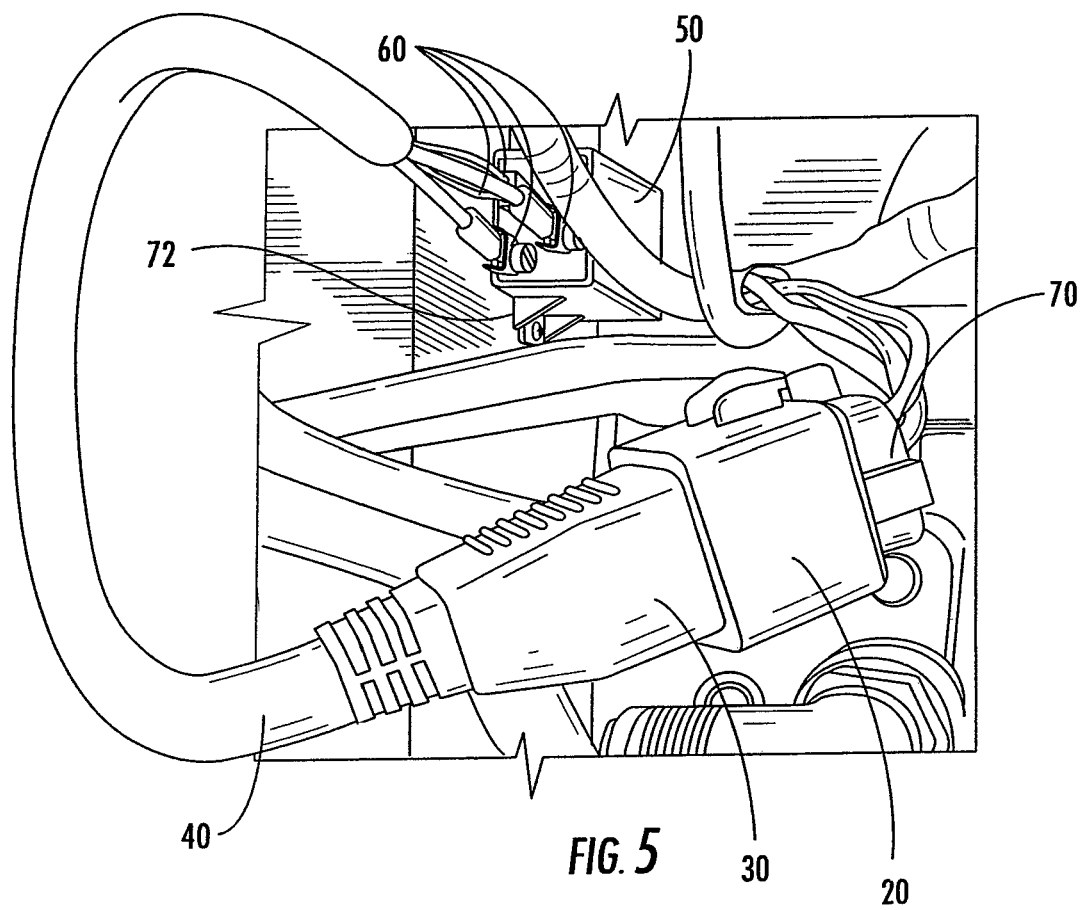
FIG. 5 shows the relay retrofit apparatus of FIG. 1 installed within a vehicle's brake system. In this embodiment, the relay retrofit apparatus is plugged into a socket and the relay is mounted to the vehicle's brake booster assembly.

In the embodiment illustrated in FIG. 1, one end of the relay retrofit apparatus 10 comprises a plug 30. In this particular embodiment, the plug includes "male" contact configurations designed to be inserted into an electrical socket. The plug's contact configuration is identical to the contact configuration 45 of the original relay 35, shown in FIG. 2. In this embodiment, the original relay 35 and the plug 30 of the relay retrofit apparatus 10 comprise a 4 pin, flat contact configuration 45. In alternative embodiments, the original relay 35 and the plug 30 of the relay retrofit apparatus 10 comprise contact configurations such as the European 7 pin configuration, a 6 way round configuration, or any other contact configuration known in the art. Additionally, other embodiments (not shown) of the relay retrofit apparatus 10 can be equipped with plugs 30 having a female contact configuration. In the embodiment depicted in FIG. 1, the relay retrofit apparatus 10 is equipped with a weather protective shroud 20. The shroud 20 is attached adjacent to the end of the plug 30 and is configured to protect the electrical pins 32 of the plug 30 from exposure to moisture, dirt, or any other substance that could adversely effect the electrical connection between the plug 30 and socket 70. The socket 70 is shown in FIG. 5 and will be described in greater detail below. In the embodiment depicted in FIG. 1, the shroud 20 includes a tab 25 designed to secure the shroud 20 to the electrical socket 70, as shown in FIG. 5. The tab 25 prevents the plug 30 and socket 70 from detaching under normal operating conditions; thereby reducing the likelihood that the electrical current flowing from the socket 70 to the relay retrofit apparatus 10 will be lost.

Electrical Conductor

In the embodiment shown in FIG. 1, the plug 30 is coupled to a second relay 50 via wires 40 having first and second ends. In this embodiment, the relay retrofit apparatus includes four wires 40 that are encased within a protective insulative material 55. The wires 40 can be made from any material that conducts electricity such as copper, zinc, tungsten, or iron. In addition, wires 40 of various length and thickness can be used to electrically couple the new relay 50 to the plug 30. In alternate embodiments (not shown) the wiring could be braided copper wires, wound wiring, or electrical filaments. In short, anything with the capability to conduct electricity between the plug 30 and the new relay 50 can be used.

Relay

In the embodiment of the relay retrofit apparatus 10 shown in FIG. 1, the first ends of the wires 40 are connected to the plug 30 and the second ends are connected to a new relay 50. In this particular embodiment, the new relay 50 is a 75 amp relay having a Double Pole Single Throw configuration. Alternate relays can be utilized in other embodiments of the present invention. As known in the art, a relay is an electrically-activated switch. A relay allows current to flow in one of two circuits, depending upon the switch's position or state. In general, relays allow electrical currents to flow between different sets of electrical contacts through the use of a "relay coil". For example, particular relays are designed so that when the relay coil is not energized, a movable contact allows electricity to flow to one set of contacts. When the relay coil is energized from a power source, the contact will be moved to allow current to flow to a separate set of contacts. Relays come in a multitude of configurations. For example, there are Single Pole Single Throw (SPST) relays, Single Pole Double Throw (SPDT) relays, Double Pole Single Throw (DPST) relays, and Double Pole Double Throw (DPDT) relays. In a Single Pole Single Throw relay, a current will only flow through a set of contacts when the relay coil is energized. In the Single Pole Double Throw relay, current will flow between the movable contact and a first fixed contact when the relay coil is deenergized and between the movable contact and a second fixed contact when the relay coil is energized. In the Double Pole Single Throw relay, when the relay coil is energized, two separate and electrically isolated sets of contacts are moved to allow current to flow to two separate sets of contacts. In a Double Pole Double Throw configuration, the relay operates like the Single Pole Double Throw relay but with twice as many contacts, i.e., there are two completely isolated sets of contacts.

Figure 3:
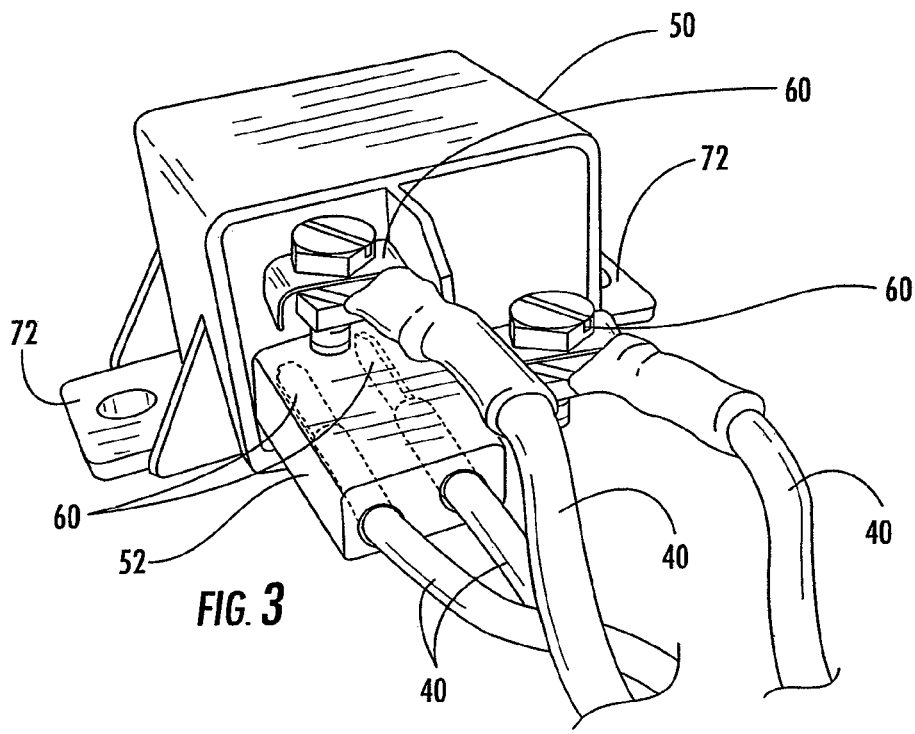
FIG. 3 shows a close up view of the relay retrofit apparatus of FIG. 1.

As illustrated by FIG. 3, the second ends of the wires 40 are connected directly to the new relay 50. As stated above, the new relay used in this particular embodiment of the relay retrofit apparatus 10 is a 75 amp double pole single throw relay having an electrical contact configuration 60 that differs from the plug's 30 electrical contact configuration. Again referring to FIG. 3, in this particular embodiment, the electrical contact configuration 60 of the new relay 50 comprises two ring terminals, one vertical spade socket and one horizontal spade socket. As shown in FIG. 3, the ring terminals utilize screws to connect the wires 40 to the relay's 50 electrical contacts 60. The remaining two wires plug into the relay 50 via spade pins. Again referring to FIG. 3, two wires configured with spade pin electrical contacts enter a connector 52 and plug into the relay 50. One spade plugs into a substantially horizontal relay socket and the other spade plugs into a substantially vertical relay socket. Relays having different electrical contact configurations can be used in the present invention.

As shown in embodiments depicted in FIGS. 1 and 3, the new relay 50 includes attachment tabs 72. The attachment tabs 72 comprise a hole and a plastic tab that extends outwardly from the new relay 50. The attachment tabs 72 are configured to secure the new relay 50 to a structure using any means of attachment known in the art, such as a screw. For example, in FIG. 5 the new relay 50 is shown secured to the vehicle's brake booster housing.

II. Use of a Relay in a Vehicle's Brake System

As described in greater detail below, the relay retrofit apparatus 10 described above can be used to replace or convert a first relay with a new relay without having to either: 1) install a new socket configured to receive the new relay, or 2) without having to splice and modify the socket to fit a new relay. The term socket 70 is also referred to as a "wiring harness" or a "wiring harness pigtail" by those skilled in the art. The terms "socket," "vehicle socket," "vehicle wiring harness," and "vehicle wiring harness pigtail" can be used interchangeably and all refer generally to any electrical socket attached to wires. For example, the relay retrofit apparatus 10 can be used to replace relays used within a vehicle's braking system. It is important to note that replacing relays within a vehicle's braking system is an exemplary context for using the relay retrofit apparatus 10 and does not limit the use of the relay retrofit apparatus 10 in additional settings or environments.

Many vehicles utilize relays to provide electricity to an electric brake motor (not shown). In this context, the relay has contact points which are open when the relay coil is deenergized. On one side of the contacts is a power supply. The other side of the contacts goes to the load, which in this case is an electric brake motor. In order for the relay coil to energize and close the circuit to the brake motor, the coil must first be grounded. In this embodiment, a flow switch (not shown) is used to complete the ground. The flow switch monitors the hydraulic flow within the vehicle's brake system. If the flow switch detects pressure, the switch stays open, thereby keeping the ground open. If hydraulic pressure or flow is lost, either due to the engine being off or due to a broken belt leading to the vehicle's brake pump, the flow switch will close and complete the ground. Once grounded, the circuit is complete and the relay coil is energized. The energized relay coil in turn completes the circuit for the electric brake motor.

Therefore, when the ignition key is in the "on" position and the engine is running, the engine (i.e. the belts) provides hydraulic power to the vehicle's braking system. If the engine dies, or a belt brakes, the flow switch energizes the relay's coil which in turn completes a circuit and activates an electric brake motor. The brake motor provides enough power to the vehicle's brake system to allow the driver to safely bring the vehicle to a stop. Likewise, if the vehicle's ignition key is in the "off" position and the engine is not running, the flow switch will activate the relay when the brake pedal is depressed and power will be supplied to the vehicle's brake system.

III. Method of Using the Relay Retrofit Apparatus

Figure 4:
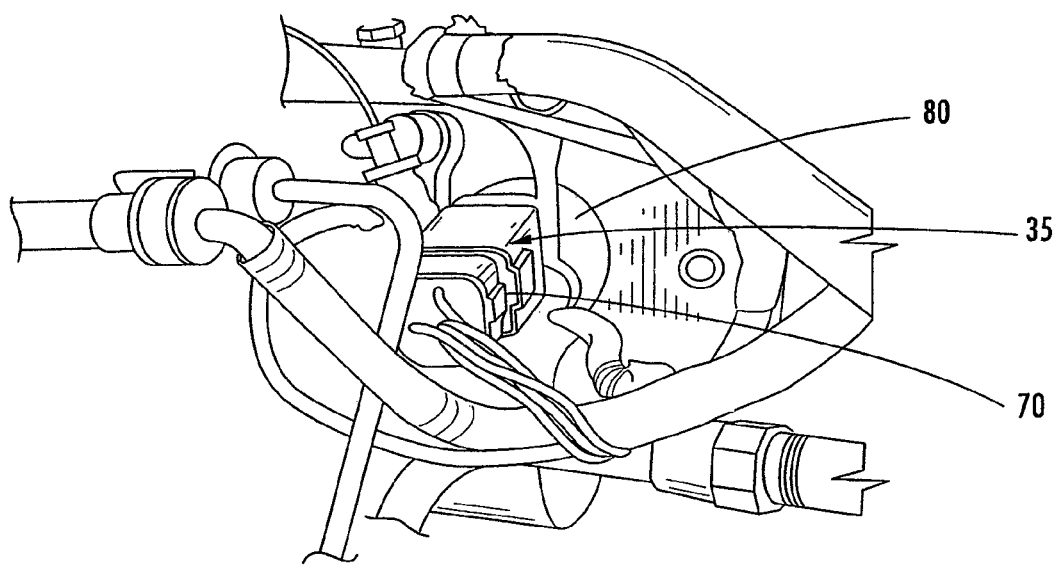
FIG. 4 illustrates a prior art method of attaching a relay to a vehicle's wiring harness. As shown, the relay is mounted to a vehicle's brake booster housing.

FIG. 4 illustrates a prior art method of attaching a relay to a vehicle's electrical system. In this particular embodiment, the original relay 35 is connected to a vehicle's electrical system via a socket 70. In the embodiment shown in FIG. 4, the original relay 35 is a 40 amp relay having a Single Pole Single Throw configuration. The original relay 35 is shown mounted to the vehicle's brake booster housing 80. In this embodiment, the brake booster housing 80 serves only as a convenient structure on which to secure the original relay 35. Other structures within a vehicle can be used to secure the original relay 35. In fact, the original relay 35 does not have to be secured at all.

In the past, replacing the original relay 35 with a new relay having a different electrical contact configuration would require that the vehicle socket 70 (or "vehicle wiring harness") be replaced. This would require splicing and modifying the vehicle's wiring harness to fit the new relay. To avoid this problem, the relay retrofit apparatus 10 allows the user to easily convert or replace the original relay 35 with a new relay 50 without having to splice a new vehicle socket into the vehicle's electrical system.

The method for replacing the original relay 35 with a new relay 50 comprises the following steps. First, the original relay 35 is disconnected and removed from the vehicle's electrical system. As shown in FIG. 4, the original relay 35 is mounted to the vehicle's brake booster housing 80. Next, the user connects the wires 40 to a new relay 50 having a different contact configuration 60 than the original relay 35. The new relay 50 shown in FIG. 3 is a 75 amp double pole relay. After the new relay 50 is coupled to the plug 30, the new relay 50 is secured in the same area as the original relay 35 and the plug 30 is connected to the vehicle socket 70. After the relay retrofit apparatus 10 is installed and connected to the vehicle's electrical system, the user can test to ensure that the circuit is working correctly. In this embodiment, wherein the relay is used in the context of a vehicle's brake system, the brake motor should run when 1) the engine is off, 2) the ignition key is in the "off" position, and 3) the brake pedal is depressed. In addition, the brake motor should also run when 1) the engine is off, and 2) the ignition key is in the "on" position. When the engine is running, the brake motor should not run. If the above test are successful, the relay retrofit apparatus 10 has been properly installed into the vehicle's brake system.

Certain of the following claims are set forth in means plus function terminology. Here follows a description of the various means used to accomplish each claimed function. The coupling means include wiring, braided copper wires, wound wiring, electrical filaments, or a long piece of metal, for example. In short, anything with the capability to conduct electricity between the plug 30 and the new relay 50 can be used. The coupling means may be made from any material that conducts electricity such as copper, zinc, tungsten, or iron. In addition, coupling means of various length and thickness can be used. The connector means includes a socket, a wiring harness, or any device capable of connecting to the electrical contacts of a relay. For example, a connector means 52 is shown in FIG. 3.

That which is claimed:

1. A relay retrofit apparatus comprising:
   a plug having a first end, a second end, and electrical contacts at the second end of the plug for connecting the plug to a socket;
   a relay electrically coupled to said plug, the relay having:
      two different sets of electrical contacts;
      two circuits corresponding to the two sets of electrical contacts; and
      a relay coil;
   wherein:
      the relay is configured to selectively allow current to flow in one of the two circuits at a time depending on a state of the relay, which can be changed by the relay coil; and
      the electrical contacts of the relay are configured differently from the electrical contacts of said plug; and
   a wiring connecting the relay to the first end of the plug.

2. The relay retrofit apparatus of claim 1, wherein said wiring is insulated.

3. The relay retrofit apparatus of claim 1 further comprising a shroud fixed to the second end of said plug.

4. The relay retrofit apparatus of claim 3, wherein said shroud encases at least a portion of said electrical contacts of said plug to provide a weatherproof connection when said plug is inserted into the socket.

5. The relay retrofit apparatus of claim 1, wherein said relay has a 75 amp dual pole configuration.

6. A relay retrofit apparatus for use in an electrical system, the apparatus comprising:
   a first relay configured to replace a second relay in the electrical system, the first relay having:
      two different sets of electrical contacts;
      two circuits corresponding to the two sets of electrical contacts; and
      a relay coil;
      wherein the relay is configured to selectively allow current to flow in one of the two circuits at a time depending on a state of the relay, which can be changed by the relay coil;
   a plug having a first end, a second end, and electrical contacts at the second end configured to be inserted into a socket of the electrical system, the electrical contacts of the plug being configured differently than the electrical contacts of the first relay;
   wiring having first ends connected to the electrical contacts at the first end of said plug and second ends opposite the first ends connected to the electrical contacts of the first relay; and
   a connecting portion having electrical contacts connected to the second ends of said wiring, wherein said connecting portion is configured to connect to the electrical contacts of said first relay.

7. The apparatus of claim 6, wherein said wiring is insulated.

8. The apparatus of claim 6, wherein said connecting portion is detachable.

9. The apparatus of claim 6, wherein said connecting portion includes a socket portion.

10. The apparatus of claim 6, further comprising a shroud fixed to said plug.

11. The apparatus of claim 10, wherein said shroud encases at least a portion of said electrical contacts of said plug when said plug is inserted into said socket.

12. The apparatus of claim 1, further comprising a connecting portion electrically coupled to said wiring and said relay.

13. The apparatus of claim 6, wherein said first and second relays have different amperage ratings.

14. The apparatus of claim 6, wherein said socket is configured to receive the second relay having a 40 amp single pole configuration and said first relay switch has a 75 amp dual pole configuration.

15. A relay retrofit apparatus comprising:
  a connector means having a first end, a second end, and electrical contacts at the second end configured for insertion into a socket configured for a first relay;
  a second relay switch having:
    two different sets of electrical contacts, wherein said electrical contacts have a different configuration than the electrical contacts at the second end of the connector means;
    two circuits corresponding to the two sets of electrical contacts; and
    a relay coil;
    wherein:
      the second relay is configured to selectively allow current to flow in one of the two circuits at a time depending on a state of the second relay, which can be changed by the relay coil; and
      the electrical contacts of the second relay are configured differently from the electrical contacts of said plug; and
  a coupling means for electrically coupling said connector means with the first end of said second relay.

16. The apparatus of claim 15, wherein said coupling means is wiring.

17. The apparatus of claim 16, where said wiring is insulated.

18. The apparatus of claim 15, further comprising a means for protecting said electrical contacts of said connector means from the weather.

19. The apparatus of claim 1, wherein the relay has a switch configuration selected from a group of switch configurations consisting of single pole single throw, single pole double throw, double pole single throw, and double pole double throw.

20. The apparatus of claim 6, wherein:
  the first relay has a first switch type selected from a group of switch types consisting of single pole single throw, single pole double throw, double pole single throw, and double pole double throw; and
  the socket is configured to connect to electrical contacts of the second relay, which has a second switch type being selected from said group of switch types and differing from the first switch type.

21. A method for retrofitting an electrical system including an electrical socket having electrical contacts and including a first relay having electrical contacts configured to mate with the electrical contacts of the socket, the first relay being at one point connected to the socket by way of the electrical contacts of the first relay being connected to the electrical contacts of the socket, the method comprising:
  replacing the first relay with a second relay in the electrical system, the second relay having:
    electrical contacts being configured differently than the electrical contacts of the first relay;
    two circuits; and
    a relay coil;
    wherein the electrical contacts of the second relay include two different sets of electrical contacts corresponding to the two circuits, and the second relay is configured to selectively allow current to flow in one of the two circuits at a time depending on a state of the second relay, which can be changed by the relay coil; and
  wherein replacing the first relay with the second relay includes:
    connecting the second relay to the socket by connecting electrical contacts of a connecting portion to the electrical contacts of the second relay and by connecting electrical contacts of a plug to the electrical contacts of the socket, wherein the plug is electrically coupled to the connecting portion by way of a wiring and the electrical contacts of the plug correspond to the electrical contacts of the replaced first relay.

22. The method for retrofitting an electrical system of claim 21 further comprising separating the first relay from the electrical socket.

23. The method for retrofitting an electrical system of claim 21 wherein the plug includes a protective shroud encasing at least a portion of the electrical contacts of the plug and the connecting step includes inserting the socket into the shroud of the plug.

* * * * *

UNITED STATES PATENT AND TRADEMARK OFFICE
CERTIFICATE OF CORRECTION

PATENT NO. : 7,591,674 B2  Page 1 of 1
APPLICATION NO. : 11/948013
DATED : September 22, 2009
INVENTOR(S) : Sutton It is certified that error appears in the above-identified patent and that said Letters Patent is hereby corrected as shown below:

Column 7,

Lines 12 and 18, cancel "switch".

Signed and Sealed this

Twenty-third Day of February, 2010

David J. Kappos
*Director of the United States Patent and Trademark Office*